Jan. 7, 1947.  C. W. DALZELL  2,413,865
THERMOSTATICALLY CONTROLLED CHARGER
Filed Nov. 19, 1942
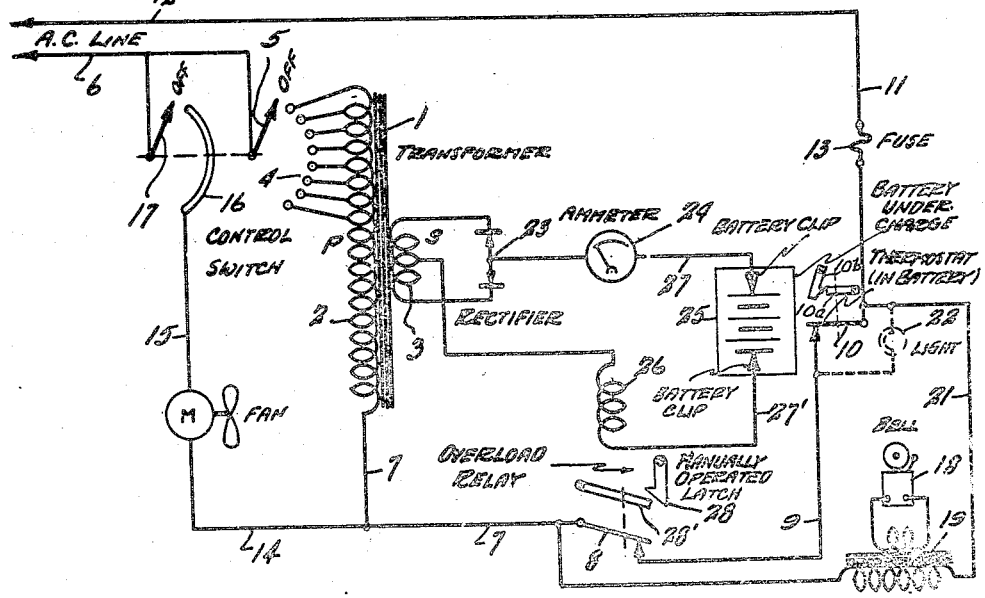
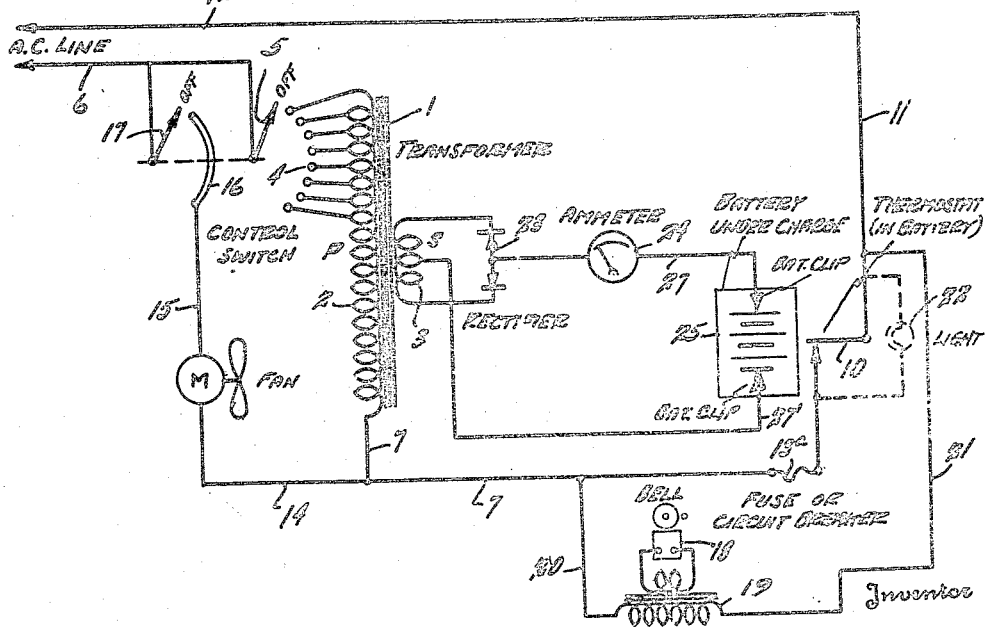
Inventor
CLARENCE W. DALZELL Patented Jan. 7, 1947

2,413,865

UNITED STATES PATENT OFFICE 2,413,865

THERMOSTATICALLY CONTROLLED CHARGER

Clarence W. Dalzell, West Caldwell, N. J., assignor to Knickerbocker Development Corporation, Belleville, N. J., a corporation of Delaware Application November 19, 1942, Serial No. 466,235

2 Claims. (Cl. 320—36)

This invention relates in general to battery chargers for the "fast charging" of storage batteries and more particularly has reference to the provision of automatic control means in the circuit of the battery charger, and to indicating means associated with the control means.

In the charging of batteries with the so-called "fast chargers" current of from 80 to 100 amperes is passed through the battery. In view of the fact that considerable damage could be effected if current at that rate were permitted to flow through the battery under charge without any automatic control battery chargers for this purpose are provided with a plurality of controls operable when an overload is produced in the circuit of the charger including the battery, or upon short circuiting or overheating of the battery for disconnecting the circuits. Many of these controls are rather complicated and some of them require the battery under charge to have a certain charge in it in order to operate the control device, since they depend for operating current upon current from the battery.

The principal object of the present invention is to provide a battery charger for the fast charging of batteries which is equipped with control and indicating devices of a construction much simpler than those of the prior art.

Another object of this invention is to provide a fast battery charger provided with control and indicating devices which are not dependent upon the current from the battery for operation thereof.

A further object of this invention is to provide a charger for the fast charging of batteries which includes a transformer having primary and secondary windings, the primary winding of which is connected to a source of current by means of a contactor and the secondary winding of which is included in a circuit together with the battery to be charged and a winding of an actuator for said contactor, said winding being operable upon the flow of excessive current therethrough to energize the actuator for opening the contactor.

Still another object of this invention is to provide a battery charger for the fast charging of batteries which includes a transformer having primary and secondary windings, the primary winding being connected to a source of current by means of a switch thermostatically actuated in response to temperatures of the battery under charge.

A still further object of this invention is to provide a battery charger for the fast charging of batteries which includes a transformer having primary and secondary windings, the primary winding being connected to a source of current by means of a contactor and the secondary winding of which is included in a circuit together with the battery to be charged and a winding of an actuator for said contactor, said winding being operable upon the flow of excessive current therethrough to energize the actuator for opening the contactor, and in which a switch is incorporated in the connection between the primary of the transformer and the source of current, said switch being thermostatically actuated in response to temperatures of the battery under charge.

It is also an object of this invention to provide a battery charger for the fast charging of batteries in which an overload opened contactor and/or a thermostatically opened switch are provided in the connection between the primary circuit thereof, and in which indicating means responsive to the opening of said contactor and/or switch are provided.

With these and other objects in view which will appear more fully hereinafter, the present invention resides in the circuit, the parts and combinations illustrated in the drawing and hereinafter described.

In the drawing:

Figure 1 is a schematic view of the circuit of a fast battery charger embodying the features of the present invention.

Figure 2 is a view similar to that of Figure 1 but illustrating a modified form of the present invention.

Referring to the drawing, there is shown in Figure 1 a schematic arrangement of the several circuits of the fast charger embodying the features of the present invention. The transformer 1 employed in the circuit is provided with a primary winding 2 and a secondary winding 3. The primary winding is tapped, and the several taps are connected to a plurality of switch contacts 4. These contacts cooperate with a switch arm 5 which is connected to one conduit 6 of an alternating current source of power. The other end of the primary winding 2 of the transformer is connected by a conductor 7 to one terminal of a contactor 8. Contactor 8 has its other terminal connected by a conductor 9 to one terminal of a thermostatically actuated switch 10. Completion of the circuit through the primary winding 2 of the transformer and through the contactor 8 and switch 10 is effected by means of a conductor 11 which is connected to the other line 12 of the alternating current power source. A fuse 13 may be incorporated in the conductor 11 to protect the circuit against extreme overloads.

A fan for cooling the transformer and rectifier is provided and has one terminal of its motor connected by a wire 14 to the conductor 7 and the other terminal of its motor is connected by a wire 15 to a conducting segment 16 of a switch, the movable arm 17 of which is connected to the alternating current conductor 6. The switch arms 5 and 17 are coupled together and are intended to operate in unison so that when the switch arm 5 is engaged with the first contact 4, the arm 17 will be brought into conductive engagement with the segment 16. Thus, as soon as the arm 5 is moved into engagement with the first contact 4, the fan will be placed in operation and will be maintained in operation so long as the switch arm 5 is in engagement with any one of the contacts 4, and so long as the contactor 8 and thermostatic switch 10 are closed.

The present invention also provides an indicator which serves to indicate when one or both of the contactor 8 and the switch 10 are open. This indicator, which is in the form of a bell 18, is operatively connected with the secondary winding of a bell-ringing transformer 19, the primary winding of which is connected by one conductor 20 to the conductor 7 and by another conductor 21 to the conductor 11. With this arrangement, even though one of the contactor 8 or switch 10 is opened, a circuit will be maintained through the primary of the bell-ringing transformer 19, and sufficient current will flow therethrough to cause the bell 18 to ring, and thereby give an audible signal indicating that contactor 8 and/or the switch 10 are open. While the motor of the fan will stop upon opening of the contactor 8 or the switch 10, sufficient current will flow through said motor and/or the primary 2 of the transformer 1 for the effective operation of the bell 18.

Now, since the indicator comprising the bell 18 will operate upon opening of either the contactor 8 or the switch 10, it is desirable to have some means to further indicate which of the contactor 8 or switch 10 is open. For this purpose, the present invention contemplates the provision of a signal light 22 which has its terminals connected to the terminals of the thermostatic switch 10. As long as the switch 10 is closed, no current will flow through the light 22, but when the switch 10 is open, the circuit normally completed by the switch 10 will then be completed by the light 22. Since only a small current will flow through the lamp 22, this will be insufficient to cause any difficulties.

The secondary 3 of the transformer 1 is connected with a circuit including a rectifier 23, an ammeter 24, the battery 25 to be charged, and a winding 26 of an overload relay. As shown in Figure 1, the rectifier 23 is of the full wave type, and for this reason, the secondary 3 of the transformer is tapped intermediate its ends. The battery 25 is connected by means of clips to the conductors 27 and 27' which form part of the circuit including the secondary winding 3 of the transformer.

Winding 26 of the overload relay serves as a means for energizing an actuating device for opening the contactor 8 included in the circuit with the primary winding of the transformer. The purpose of this construction is to prevent an excessive flow of current through the secondary circuit of the transformer which includes the battery under charge. For this reason, the winding 26 is so calibrated that when a predetermined current flows through the same, the movable element of the contactor 8 will be displaced to break the connection normally provided by said normally closed contactor 8. The construction of the overload relay which includes the winding 26 and the contactor 8 is such that when the overload of current flowing through winding 26 decreases, the contactor would close. In accordance with the present invention, however, the movable element of the contactor 8 is mechanically connected to a latch arm 28; one end of which is pivoted and the other end of which is adapted to cooperate with a pivoted pawl 28 which is gravity actuated to latch the bar 28' in a position to retain the contactor 8 in open position. Obviously, the pawl 28 may be either gravity actuated or spring pressed. In order to release the movable element of the contactor 8 and enable the same to close, it is necessary to displace the pawl 28 so that the latch bar 28' may be free. This is accomplished by manually actuating the pawl 28, and it is one of the features of the present invention that the means for actuating the pawl 28 or the pawl itself be visible so that by a mere inspection thereof, the operator can determine whether or not the contactor 8 is open. Thus, in addition to the audible indicator 18 for indicating whether one of the contactor 8 or the switch 10 is open, there is also provided the light 22 for indicating that the switch 10 is open and the visible portions of the latch 28 or its actuating means for indicating whether or not the contactor 8 is open. As a matter of economy, when the overload relay is provided with a visible latch as above described, it will serve to indicate whether or not the contactor 8 is open, the light 22 may be omitted.

In Figure 2 of the drawing there is illustrated a modified form of the invention. In this figure, the parts identical to those shown in Figure 1 have been indicated by the same reference characters, and further description of these parts will not be made. The principal difference between the circuit shown in Figure 2 and that shown in Figure 1 is that in Figure 2 the overload relay including the contactor 8, the winding 26, and the latch mechanism is omitted. In the form of the invention shown in Figure 2, the control of the charger depends entirely upon the operation of the thermostatically actuated switch 10. In this form of invention, however, it is deemed advisable to locate the fuse and the conductors 20 and 21 of the bell-ringing circuit so that if either the switch 10 is opened, or the fuse 13 is blown the bell 18 will ring. In the place of a fuse, a circuit breaker may be employed and may be found more desirable than the fuse in that the closing of the same will be a much simpler operation than the replacement of the fuse. In this instance, therefore, the opening of the circuit breaker would cause the bell circuit to become energized in the same manner as the blowing of a fuse or the opening of the switch 10.

In this form of the invention, the light 22 will serve to indicate whether or not the thermostatically actuated switch 10 is opened, and in this particular form of the invention, the light will be more important than in the circuit illustrated in Figure 1. Of course, as the fuse is in a position for easy inspection, the operator may inspect a fuse and thus determine whether it has blown or the switch 10. With a circuit breaker, the position of the circuit breaker may be visibly ascertained and used as an indication as to whether the circuit breaker or the switch 10 is open.

In both forms of the invention shown in Figures 1 and 2, the thermostatically actuated switch 10 must be constructed to carry a current sufficient for the proposed operation of the charger.

In the operation of the invention as shown in Figure 1, a battery is connected in the circuit by means of the clips provided for this purpose in the correct polarity and then the main control switch, which serves to actuate both switch arms 5 and 17, is actuated to move arm 5 to the first contact 4. This serves to supply power to the fan motor and to the primary winding of the transformer. Under these circumstances, the power is supplied to the fan and the primary winding of the transformer 1 only if the overload relay is in a position in which the contactor 8 is closed and the thermostatic switch 10 is closed, and the fuse 13 is intact. Due to the closed position of the contactor 8 and the thermostatic switch 10, the transformer 19 is short circuited and insufficient current will flow through the bell ringing transformer to cause the bell to ring. Thus the bell will not ring upon starting the charger.

If, during the charging of the battery, the current rises in the output circuit to the trip point of the overload relay, the contactor 8 will be opened and will be held open by the movable releasable latch 28, which engages the arm 28. This will serve to cut off the flow of current through the primary of the transformer and the cooling fan. When contactor 8 opens, it disconnects a good, low impedance path for power to the transformer and fan motor, and only sufficient current will flow through the bell ringing transformer circuit to actuate the bell. This current will be so low that the output charging current will be reduced to zero because the secondary voltage of the transformer 1 under these circumstances is so low that it cannot charge the battery.

When the above described conditions exist, the operator will be summoned by the bell and will turn off the main control switch which will stop the ringing of the bell and disconnect the charger from the power line. After ascertaining by inspection that the overload relay has opened the contactor 8, he may release the latch 28 and then again start the charging by moving the main switch to bring the switch arm 5 onto the first contact 4. Of course, if the charger is equipped with a light such as 22 and the circuit is broken by the opening of the contact 8, then the operator can determine by the absence of operation of the light 22 that it is the contactor 8 which is open rather than the thermostatic switch 10. On the other hand, if the thermostatic switch 10 has opened and been the means of breaking the circuit and causing the bell 18 to ring, this can be readily determined by the illumination of the light 22. As hereinbefore explained, however, if the light 22 is omitted and the pawl 28 of the overload relay is visible, the operator can determine from the position of the pawl 28 as to whether the contactor 8 or the switch 10 has opened.

The fuse 13 is placed in the circuit primarily to protect the transformer in case of a short-circuited rectifier, and will be blown out so seldom that it can be considered a rarity. Consequently, the provision of the bell indicator 18 for signaling the opening of the contactor 8 or the switch 10 is sufficient for the purposes intended.

In some instances it may be desirable to construct the thermostatic switch 10 with a lockout mechanism 10a and 10b so that when the switch is once opened, it will not reclose until after a lockout latch is released. The provision of such a latch on the thermostat would prevent the charger from coming on again once the thermostat, which has been left in the battery, cools down with the cooling of the battery. If an operator were to leave a battery connected to the charger equipped with an ordinary thermostat without a lockout mechanism thereon for quite a few hours, the charger would charge the higher rate into the battery thus heating the battery and causing the thermostat to open. After the battery and thermostat cool sufficiently to permit the thermostat to reclose, the charger would again become active and the battery would again be heated sufficiently to trip the thermostat. Such a sequence of events would continue until the operator reached the scene and turned off the charger. While this would be disadvantageous in some instances, in other cases it would not be a serious drawback because the time of cooling of the battery would be considerable, and unless the charger was left unattended for a long period of time, no harm would result. On the other hand, the provision of the lockout feature insures that there will be no further action of the charger once the thermostatically controlled switch 10 has opened.

The control embodied in the present invention embodies devices which operate without external direct current. The overload relay, for instance, is operated from the direct current circuit, and is normally closed at all times except when an overload flows through the direct current charging circuit. The thermostatically controlled switch, on the other hand, is held closed and will open only when it is raised to a temperature sufficiently high to actuate the same. When, for any reason, the connection of the charger to the power line is broken, the fan will stop and the charging current flowing into the battery will be reduced to zero. The charger, however, will remain intact in this form until the alternating current power is again applied. At this time, the transformer and fan will become energized again and the charging will proceed.

Aside from the simplicity of the above circuit it should be noted that there are no relays in the charging circuit which need be actuated by battery power. This enables a battery, having no voltage whatever, to be connected to the charger and charged without any external direct current system. Furthermore, the alternating current power may be supplied through the secondary of the transformer and the rectifier independently of any externally controlled device which might be operated from a battery therefor.

It should also be noted that the control devices operate on the closed circuit principle: That is, if any of the control wires to the thermostat, which is a portable device on the end of a long cable, should be broken, the charger is cut off, and the operator will be notified in this manner that there is trouble in the apparatus. If the charger was not made to operate on this closed circuit principle, there might be a faulty circuit including the thermostat and the operator's own wiring of the same would connect the battery to the charger, and the automatic thermostatic switch would not serve to disconnect the charging circuit when the battery had been raised to a predetermined temperature. This would result in damage to the battery, unless, by coincidence, the operator would be watching the operation carefully, and note the excessive gassing and failure of the charger to automatically shut off after a reasonable length of time.

The operation of the charger employing the circuit shown in Figure 2 is substantially identical to that of Figure 1, the principal difference residing in the omission of the overload relay. In this circuit, however, the thermostatically actuated switch 10 serves as the principal control of the charging operation. Of course, as hereinbefore explained, the fuse or circuit breaker is included within the portion of the circuit, a break in which operates the indicating means. Furthermore, the fuse or circuit breaker will take care of any overloads in the circuit.

From the foregoing description, it will be appreciated that the present invention provides a battery charger, the circuits of which are of simple construction, and include means extremely effective for automatically controlling the charging of the battery under fast charging conditions so that the battery may be adequately and safely charged.

I claim:

1. A battery charger comprising a transformer having primary and secondary windings, a primary circuit including a connection for connecting the primary winding to a supply circuit, a rectifier, a secondary circuit connecting said secondary winding in series with the rectifier and battery to be charged, a thermostatically actuated switch, responsive to the electrolyte temperature of a battery under charge, in series with the connection between the primary winding and said supply circuit, indicating means operable upon opening of the primary circuit either by the connection or the thermostatically actuated switch and other indicating means operable solely upon opening of the thermostatically actuated switch.

2. A battery charger comprising a transformer having primary and secondary windings, a primary circuit including a contactor for connecting the primary winding to a supply circuit, a rectifier, a secondary circuit connecting said secondary winding in series with the rectifier and battery to be charged, an actuator for opening said contactor and having an energizing winding in said secondary circuit, a thermostatically actuated switch, responsive to the electrolyte temperature of a battery under charge in the connection between the primary winding and said supply circuit, indicating means operable upon opening of the primary circuit either by the contactor or the thermostatically actuated switch, and other indicating means operable solely upon opening of the thermostatically actuated switch.

CLARENCE W. DALZELL.